United States Patent
Laplace (10) Patent No.: US 10,583,981 B2
(45) Date of Patent: Mar. 10, 2020

(54) METHOD FOR CONSTRUCTING A CARTON FLOW BED RACK AND CARTON FLOW BED RACK

(71) Applicant: Interroll Holding AG, Sant' Antonino (CH)

(72) Inventor: Jean Michel Laplace, La Roche sur Yon (FR)

(73) Assignee: INTERROLL HOLDING AG (CH)

( * ) Notice: Subject to any disclaimer, the term of this patent is extended or adjusted under 35 U.S.C. 154(b) by 0 days.

(21) Appl. No.: 15/768,623

(22) PCT Filed: Jun. 29, 2017

(86) PCT No.: PCT/EP2017/000776
§ 371 (c)(1),
(2) Date: Apr. 16, 2018

(87) PCT Pub. No.: WO2018/001563
PCT Pub. Date: Jan. 4, 2018

(65) Prior Publication Data
US 2018/0305121 A1    Oct. 25, 2018

(30) Foreign Application Priority Data
Jul. 1, 2016    (EP) .................... 16290127

(51) Int. Cl.
*B65G 1/02*    (2006.01)
*B65G 13/11*    (2006.01)
*B65G 13/12*    (2006.01)

(52) U.S. Cl.
CPC .............. *B65G 1/023* (2013.01); *B65G 1/02* (2013.01); *B65G 13/11* (2013.01); *B65G 13/12* (2013.01)

(58) Field of Classification Search
CPC .......... B65G 1/02; B65G 1/023; B65G 13/11; B65G 13/12
See application file for complete search history.

(56) References Cited

U.S. PATENT DOCUMENTS

| | | | |
|---|---|---|---|
| 3,894,634 A | 7/1975 | Gotham et al. | |
| 4,372,451 A * | 2/1983 | Rasmussen | B65G 1/023 211/151 |

(Continued)

FOREIGN PATENT DOCUMENTS

| | | |
|---|---|---|
| CN | 2747976 | 12/2005 |
| CN | 201980659 | 9/2011 |

(Continued)

OTHER PUBLICATIONS

Chinese Office Action dated Apr. 30, 2019.

(Continued)

*Primary Examiner* — Gene O Crawford
*Assistant Examiner* — Keith R Campbell
(74) *Attorney, Agent, or Firm* — Gerald E. Hespos; Michael J. Porco; Matthew T. Hespos (57) ABSTRACT

A method for constructing a carton flow bed rack (1) includes specifying a number of levels of the carton flow bed rack (1). The method also includes specifying whether and where each level has a load end, and/or an unload end, and/or a stop end. The method further includes specifying at least one of a height, a width, and a depth of the carton flow bed rack and providing and dimensioning components for assembling the carton flow bed rack according to the specifications.

12 Claims, 4 Drawing Sheets

(56) References Cited

U.S. PATENT DOCUMENTS

| | | | | |
|---|---|---|---|---|
| 4,765,493 A | * | 8/1988 | Kinney | B65G 1/023 |
| | | | | 193/35 R |
| 5,115,920 A | | 5/1992 | Tipton et al. | |
| 5,295,591 A | | 3/1994 | Slater | |
| 5,887,732 A | | 3/1999 | Zimmer et al. | |
| 7,090,064 B2 | * | 8/2006 | Lutz | B65G 1/023 |
| | | | | 193/35 R |
| 2017/0088370 A1 | * | 3/2017 | Dion | B65G 57/081 |

FOREIGN PATENT DOCUMENTS

| | | |
|---|---|---|
| CN | 204896485 | 12/2015 |
| CN | 205132246 | 4/2016 |

OTHER PUBLICATIONS

Flow Rack—May 11, 2013.
International Search Report and Written Opinion dated Oct. 19, 2017.

\* cited by examiner

METHOD FOR CONSTRUCTING A CARTON FLOW BED RACK AND CARTON FLOW BED RACK

BACKGROUND

Field of the Invention

The invention relates to a method for constructing a carton flow bed rack and a carton flow bed rack.

Description of the Related Art

Carton flow bed racks are used to store and/or distribute loads, in particular parcels, cartons, and/or other goods. Carton flow bed racks are characterized in that they comprise a load side from which the rack is loaded and an unload side from which the rack is unloaded. There are carton flow bed racks that are loaded and unloaded at the same side. These carton flow bed racks are referred to as LIFO carton flow bed racks, an abbreviation for 'last in first out'. There are also other carton flow bed racks that are loaded and unloaded at different, e.g. opposite, sides. These carton flow bed racks are referred to as FIFO carton flow bed racks, an abbreviation for 'first in first out'. Carton flow bed racks may comprise wheel tracks to transport loads from one side of the rack to the other side.

Common carton flow bed racks comprise predetermined sizes and are offered as either LIFO or as FIFO racks.

The problem relates to providing a carton flow bed rack suitable for a specific use.

SUMMARY

An aspect relates to a method for constructing a carton flow bed rack, comprising the steps of:
- specifying a number of levels of the carton flow bed rack;
- specifying whether and where each level comprises a load end, and/or an unload end, and/or a stop end;
- specifying at least one of a height, a width, and a depth of the carton flow bed rack; and
- providing accordingly dimensioned components for assembling the carton flow bed rack according to said specifications.

According to this method, a carton flow bed rack is first specified and later assembled according to the specifications. The specifications may be specified by a user, e.g. a customer, individually, and/or they may be specified by a manufacturer and/or a seller of the carton flow bed rack according to other and/or further needs. For example, the user may either specify a carton flow bed rack comprising a specific width, or a user may only specify that he wants to fill a hall comprising a given width with one or more carton flow bed racks. In the latter case, the manufacturer and/or seller of the carton flow bed rack may specify the width of the one or more flow bed racks which is suitable to fill said hall with the given width. Thus, the specifications correspond to selections and/or choices established in a planning phase for the carton flow bed rack.

The number of levels of the carton flow bed rack may be specified as such. The number of levels may depend on the height of the carton flow bed rack and/or on a typical working height at the carton flow bed rack. For example, in case the carton flow bed rack is operated by a person, the working height of an average person operating the carton flow bed rack may be considered. The working height may also include a consideration of a ladder and/or a tread that influences the working height of the operator. The working height may also depend on the working height of a machine like a robot and/or a forklift.

Furthermore, it is specified for each level of the carton flow bed rack whether this level should be implemented as a FIFO level or as a LIFO level. FIFO levels, namely 'first in first out' levels, comprise a load end at one side and an unload end at another side, e.g. the opposite side. LIFO levels, 'last in first out' levels, comprise a stop end at one side and a combined load/unload end at the opposite side. In other words, specifying for each level whether and where each level comprises its load end, its unload end and/or its stop end corresponds to specifying each level as either a FIFO- or a LIFO-level. The corresponding specification of the end sides may either be done individually for each level, or may be specified once for all levels of the carton flow bed rack.

At least one, preferably at least two or even all three, dimensions, namely the height, the width, and the depth, of the carton flow bed rack are specified. Therein, each dimension may be specified individually. Thus, the three dimensions of the carton flow bed rack may be freely scalable or scalable at a plurality of different scalings. Each dimension may comprise a predetermined upper and/or lower limit. For example, the height of the carton flow bed rack may be specified up to a maximum building height of, e.g., twenty meters as upper limit. The height may also be specified within a predetermined lower limit of, e.g., twenty centimetres. In this example, the height of the carton flow bed rack may be selected between 20 cm and 2000 cm. The same may be applicable for each dimension of the carton flow bed rack.

After establishing these specifications, the components required and/or sufficient for assembling the carton flow bed rack according to said specifications are provided as accordingly dimensioned components. The provision and/or selection of the components may further be based on further specifications identified in the embodiments of the invention.

The components of the carton flow bed rack may be selected from a pool of standardised components or may be produced according to said specifications. The components enable the assembly and the construction of any carton flow bed rack specified in the method. The components may comprise poles and/or beams that are dimensioned according to the established specifications. For example, the length of a support beam may be cut, and thus dimensioned, according to the specified width and/or depth of the carton flow bed rack. Alternatively, the support beam may be produced at the desired, specified width and/or depth as accordingly dimensioned component. Similarly, support poles may be cut, and thus dimensioned, according to the specified height of the carton flow bed rack, or they may or they may be produced at the desired, specified length as accordingly dimensioned component.

In the carton flow bed rack, the height refers to a substantially vertical extension of the carton flow bed rack, in particular of its vertical support poles. Both the width and the depth refer to a substantially horizontal extension of the carton flow bed rack. The terms 'horizontal', 'vertical', 'up', and/or 'down' and the like may refer to the reference system of the Earth in the assembled state of the carton flow bed rack. The depth of the carton flow bed rack refers to the distance from one end side of the carton flow bed rack to its opposite end side. In a LIFO-rack or -level, the depth refers to the distance between the stop end and load/unload end of the individual level. In a FIFO-rack or -level, the depth refers to the distance between the load end and the unload end of each level of the carton flow bed rack. The width of the carton flow bed rack refers to the distance between side beams of the carton flow bed rack that define the width of the individual levels of the carton flow bed rack substantially perpendicular to a transport direction of the loads within the individual levels.

The method enables a versatile configuration of a carton flow bed rack. In that the dimensions of the carton flow bed rack may be specified individually, and in that the configuration of each level of the carton flow bed rack as either FIFO or LIFO may be specified individually, the carton flow bed rack may be adapted to a specific need of the customer. Thus, the carton flow bed rack may be adapted to a specific work station and/or to a specific workflow.

According to an embodiment, the height, the width, and/or the depth of the carton flow bed rack are specified continuously variable, and the dimensioned components are produced at a component-station. The component-station may be located at the manufacturer and/or seller of the carton flow bed rack. Herein, any height, any width, and/or any depth may be specified continuously variable, e.g. within an upper and/or lower limit as referred to above. In this embodiment, the height, width, and/or length may be specified and chosen substantially freely, e.g. not limited by any predetermined scaling for the dimensions of the carton flow bed rack. Thus, the design-freedom of the carton flow bed rack is increased. The components may be produced at the component station at any of the desired and specified dimensions.

However, at the end(s) of the components, e.g. at the end(s) of the support beams, attachment means may be provided at predetermined and, thus, not specifiable positions to enable the construction of the rack. Said attachment means may be provided as recesses, openings, protrusion, and the like. Thus, some rack-settings of the carton flow bed rack may be predetermined and not specifiable, e.g. a constant distance of at least one of the attachment means at an end of at least one component. The position of at least some of the attachment means may be predetermined to connect adjoining components. These predetermined rack-settings may influence the range in which the height, width, and/or length may be specified and chosen freely. In particular, the predetermined rack-settings may influence the lower and/or upper limit of the range in which the dimensions may be specified. Thus, the specifications may be made with respect and in consideration of some predetermined rack-settings.

The constant, predetermined distance of the attachment means from the ends of the support beams may depend on a pitch of a production machine at the component-station. Said pitch, and thus, the predetermined distance, may be from about 3 mm to about 100 mm, in particular from about 5 mm to about 30 mm, preferably about 10 mm to about 20 mm. At the component station, the components may, e.g., be produced in a roll form process and/or in a bending process.

According to an alternative embodiment, at least one of a height, a width, and a depth of the carton flow bed rack is specified within a predetermined scaling for each of the three dimensions. Furthermore, the components for assembling the carton flow bed rack are provided and dimensioned according to said specifications from standardised components.

Here, at least one, preferably at least two or even all three, dimensions, namely the height, the width, and the depth, of the carton flow bed rack are specified within their respective predetermined scaling. Therein, each dimension may comprise its own predetermined scaling. For example, the height may be scalable at five centimetres, while the width may be scalable at three centimetres. Thus, the three dimensions of the carton flow bed rack may be freely scalable at a plurality of different scalings. Each scaling may comprise a predetermined upper and/or lower limit. For example, the height of the carton flow bed rack may be scaled up to a maximum building height of, e.g., twenty meters as upper limit. The height scaling may be, e.g., five centimetres. The height may also be specified within a predetermined lower limit of, e.g., twenty centimetres. In this example, the height of the carton flow bed rack may be selected from 20 cm, 25 cm, 30 cm, . . . , 1995 cm, 2000 cm. The same may be applicable for each dimension of the carton flow bed rack.

In other words, each of the height, the width, and the depth may be specified and/or selected within a predetermined scaling comprising a predetermined step size, a predetermined lower limit, and a predetermined upper limit. However, each of said three dimensions may be chosen from a plurality of different choices for each dimension, e.g. of at least five or ten different choices, preferably even more different choices per dimension.

After establishing these specifications, the components required and/or sufficient for assembling the carton flow bed rack according to said specifications are selected from standardised components, e.g. from a pool of standardised components. The components are standardised in that they enable the assembly and the construction of any carton flow bed rack specified in the method from these standardised components. The standardised components may comprise poles and/or beams that are dimensioned according to the established specifications. For example, the length of a support beam may be cut, and thus dimensioned, according to the specified width and/or depth of the carton flow bed rack. Similarly, support poles may be cut, and thus dimensioned, according to the specified height of the carton flow bed rack.

The standardised components are scalable according to the predetermined scaling. For example, each support beam and/or support pole may comprise a plurality of recesses and/or openings for mounting said support pole and/or said support beam to a further component of the carton flow bed rack. Each pole and/or each support beam may comprise a plurality of said recesses and/or openings that are spaced apart from each other at the predetermined scaling distance. For example, a side beam of the carton flow bed rack may comprise a plurality of openings along its extension length. The plurality of openings may be provided along the whole length of the side beam at a distance of, e.g., 2.5 cm. Thus, the depth of the carton flow bed rack may be specified within a predetermined depth scaling of 2.5 cm. The same may apply to the predetermined width scaling and/or the predetermined height scaling.

Each selected standardised component is dimensioned according to the specifications, e.g. the specified depth, width, and/or height. The predetermined scaling of the height, the width, and/or the depth may depend on a regular spacing of attaching means provided along the standardised components, wherein the attaching means are spaced apart from each other at the respective predetermined scaling. These attaching means may, e.g., be recesses, holes, protrusions, and the like.

Providing the pool of the standardised components that enables the assembly of the different available carton flow bed racks simplifies and speeds up the process of constructing the carton flow bed rack.

According to a further development of this embodiment, the height, the depth, and/or the width of the carton flow bed rack is specified within a predetermined scaling of at most 5 cm. Preferably, at least two (e.g. the width and the depth) or all three of the dimensions are specified within said predetermined scaling of at most five centimetres. Here, the individual scalings may be different from each other. For example, the predetermined height scaling may be five centimetres, the predetermined depth scaling may be two centimetres, and/or the predetermined width scaling may be four centimetres. The scaling of the dimensions of the carton flow bed rack may be provided either in the metric system or in the U.S. customary measurement system, depending on the intended market. The narrow scaling enables an individual configuration of the carton flow bed rack.

According to another further development of this embodiment, the height of the carton flow bed rack is specified within a predetermined height scaling of at most 3 cm, the depth of the carton flow bed rack is specified within a predetermined depth scaling of at most 3 cm, and the width of the carton flow bed rack is specified within a predetermined width scaling of at most 2 cm. This high scalability of the carton flow bed rack suffices nearly all known requirements for carton flow bed racks.

According to an embodiment, the components are produced at a component-station in a roll form process. Therein, a long strip of sheet metal, e.g. coiled steel, is bent into a desired cross-section. The strip may pass through sets of rolls mounted on consecutive stands, each set performing only an incremental part of the bend, until the desired cross-section and/or profile of the component is obtained. Roll forming is advantageous for producing constant-profile parts at long lengths and/or in large quantities.

According to an embodiment:
at least one support pole is selected, dimensioned, and assembled according to the specified height; and/or
at least one side beam is selected, dimensioned, and assembled according to the specified depth for each level of the carton flow bed rack; and/or
at least one end beam for each specified load end, for each specified unload end, and/or for each specified stop end, is selected, dimensioned, and assembled according to the specified width.

Here, the components may either be produced at the specified dimension, or they may be selected from a pool of standardised components comprising a standardised support pole, a standardised side beam, and/or a standardised end beam. In particular, the pool of standardised components may comprise a single standardised support pole that may be selected and assembled in the carton flow bed rack at all positions at which a support pole is required. The support pole may be assembled in a substantially vertically aligned direction defining the overall height of the carton flow bed rack.

The pool of standardised components may also comprise only a single standardised side beam that may be scaled and/or dimensioned at the specified depth.

Each level of the carton flow bed rack may comprise (e.g. exactly) two side beams at opposing lateral side ends of the respective level and/or of the carton flow bed rack.

The standardised end beam may be used and/or assembled in the carton flow bed rack as either a load beam, an unload beam, a load/unload beam, and/or as stop beam.

In a FIFO-rack, two end beams may be selected and assembled for each level of the carton flow bed rack, one end beam as the load beam and the other end beam as the unload beam of the respective level. In a LIFO-rack, also two end beams may be selected and assembled for each level, one end beam as the stop beam and the other end beam as the load/unload beam. Here, the same end beam may be used as either a load beam, an unload beam, a stop beam, or as load/unload beam. The exact functionality of the end beam may depend on the exact position within the carton flow bed rack, e.g. on its installation height with respect to the respective level of the carton flow bed rack.

The length of the standardised support pool is scalable and, thus, dimensionable, to the specified height. The length of the standardised side beam is scalable to the specified depth. The length of the standardised end beam is scalable to the specified width.

The pool of standardised components may comprise a single end beam, or it may comprise a plurality of different end beams, e.g., two end beams comprising a different beam-height. Each of the different end beams may be used as either of the four different kinds of end beams listed above. In this embodiment, a minimum number of different standardised components are required that enable providing, dimensioning and/or assembling the support structure of the carton flow bed rack according to the specified dimensions. The pool may comprise further components, in particular mounting devices to connect the beams and/or poles referred to above. This limited number of standardised components enables a quick and easy preparation and assembly of the carton flow bed rack.

According to a further development of this embodiment:
at least one unload tray is selected and assembled at a selectable inclination angle at each specified unload end of the carton flow bed rack; and/or
at least one wheel track for transporting loads within a level of the carton flow bed rack is selected and assembled at each load end of the carton flow bed rack; and/or
at least one intermediate beam for supporting a wheel track and/or an unload tray is selected, dimensioned according to the chosen width, and assembled; and/or
at least one mounting device is selected and assembled for connecting each end beam to a side beam; and/or
at least one support device is selected and assembled for connecting each side beam to at least one support pool.

All the above components may be in the pool of standardised components.

A further specification may be specified and considered when selecting the components for the carton flow bed rack. In particular, the inclination angle of the unload tray may be specified and/or selected. The unload tray may be assembled at each unload end of each level of the carton flow bed rack. The unload tray may be in the pool of standardised components as standardised unload tray that may be dimensioned so that it fits within the respective level provided at the specified width. The unload tray may be dimensioned without any predetermined tray scaling or within a predetermined tray scaling, e.g. within a predetermined tray scaling of at most five centimetres.

One or more wheel tracks may be selected and assembled within the carton flow bed rack, in particular between each load end of each level and an intermediate beam of the respective level of the carton flow bed rack. The wheel track may be in the pool of standardised components. The wheel track may also be dimensioned according to the specified depth. However, the length of the dimensioned wheel track may not correspond to the full depth specified for the levels of the carton flow bed rack. The length of the wheel track may be dimensioned so that it fits within the level of the carton flow bed rack besides an unload tray. A length of the wheel track may be specified within a predetermined track scaling, e.g. depending on the wheel diameter and/or the distance between the individual wheels within the wheel track.

As further item of the pool of standardised components, there may be the standardised intermediate beam. The intermediate beam may be used and assembled within the carton flow bed rack to support any individual level of the carton flow bed rack. Here, the intermediate beam may be used as support for, e.g. a wheel track and/or a unload tray of the respective level. The intermediate beam may be provided as standardised intermediate beam that may be dimensioned according to the specified width. Herein, the length of the intermediate beam may be dimensioned so that it corresponds to the specified width. Each level may be provided with one or more intermediate beams.

The pool of standardised components may further comprise mounting devices for connecting each end beam to a side beam. Herein, there may be a single standardised mounting device for connecting left and right ends of both the side beams and the end beams to each other. Thus, the pool of standardised components may comprise only a single standardised mounting device for establishing all these connections between the substantially horizontally arranged beams of the carton flow bed rack.

Furthermore, the support device may be provided as a single standardised support device for establishing and/or providing all the connections between each support pole and the respective side beam. The support device may also be selected and assembled in the carton flow bed rack as a connection between the support poles and the end beams.

According to a further development, the pool of standardised components comprises further items. Herein:
  at least one side cap is selected and assembled at each end of the side beams; and/or
  at least one end cap is selected and assembled at each end of the end beams.

The end beams, the side beams and/or the support poles may be provided as substantially hollow profiles that provide significant stability at low weight. However, whenever these hollow profiles are cut and/or dimensioned to their respective length, said members may provide sharp edges. The side caps and/or the end caps reduce an injury risk at said beams of the carton flow bed rack. The pool of standardised items may comprise exactly two side caps which are mirror-symmetric to each other for closing two opposite ends of the side beams of the carton flow bed rack. Similarly, the pool of standardised components may comprise two end caps that are substantially mirror-symmetric to each other for closing the two opposite ends of the end beams. In the embodiment comprising the end beams with different beam-heights, there may be provided more than just these two end caps to enable closing of all the different end beams, or there may be provided versatile end caps that may be used to close the ends of either end beam.

According to an embodiment, the method further comprises the step of specifying an inclination angle of at least one unload tray at each unload beam of the carton flow bed rack from at least two different inclination angles. This embodiment enables further individualisation of the carton flow bed rack. Preferably, the inclination angle of the unload tray may be chosen from at least three different inclination angles. The inclination angles may be specified within a lower limit of about five degree and within an upper limit of about fifteen degree. The inclination angles may be specified for each level of the carton flow bed rack individually or once for all unload ends of the carton flow bed rack. The inclination angle of the unload tray specifies the inclination angle with respect to the side beam and/or with respect to a substantially horizontal direction of the unload tray, wherein the lower end of the unload tray adjoins the unload beam of the respective level of the carton flow bed rack. The inclination angle may correspond to a specific workflow in which the carton flow bed rack is used.

According to an embodiment, the method further comprises the steps:
  specifying a number of wheel tracks at each load beam of the carton flow bed rack; and/or
  specifying a number of intermediate beams for each level of the carton flow bed rack.

The number of wheel tracks for each level may be specified once or for each level individually. The number of wheel tracks may define the size of the loads and/or cartons loadable onto the respective level at its load end. The wheel tracks may be dimensioned to correspond to a specified part of the depth of the carton flow bed rack. The number of intermediate beams may depend on the depth of the carton flow bed rack and may, e.g., be specified automatically to provide sufficient support. The further specifications of this embodiment enable further individualisation of the carton flow bed rack.

According to an embodiment, the method further comprises the step of specifying the beam-height of each end beam of the carton flow bed rack. For example, at the load end of each level, a beam-height with an upper end corresponding to an upper height of adjoining wheel tracks may be desirable. At the unload end of the respective level, a beam-height providing a stop and/or a step for the loads at an unload tray may be desirable. Here, the end beams, and in particular the beam-height of the end beams, may be chosen, and/or selected, and/or specified individually and/or automatically. Herein, the standardised end beams in the pool of standardised components may be provided with at least two different beam-heights, corresponding to a larger and a smaller overall beam-height, in particular in the cross-section of the respective end beam.

According to an embodiment, the method further comprises a step of specifying a vertical distance between two adjacent levels of the carton flow bed rack within a predetermined scaling of at most five centimetres. This step defines the vertical distance between two adjacent levels, in particular between each two adjacent levels of the carton flow bed rack. This vertical distance may be chosen within the predetermined level scaling for each two adjacent levels individually, or once for all levels of the carton flow bed rack.

According to an embodiment, the method further comprises the steps:
  transmitting said specifications regarding the carton flow bed rack to a component-station;
  at the component-station, selecting the required components from standardised components; and
  at an assembly-side, assemble the carton flow bed rack from the selected and dimensioned components.

Herein, the component station may comprise and/or be able to fabricate the pool of standardised components from which the components are selected that are required and necessary for the individually specified carton flow bed rack. At the component station, e.g. sufficiently long support poles are selected to enable the specified height of the carton flow bed rack, sufficiently long side beams are selected for each level of the carton flow bed rack to provide the specified depth, and/or sufficiently long end beams are selected to enable realisation of the specified width of the carton flow bed rack. Here, the selection may be processed according to economic standards. For example, for a specified height of two metres, the shortest support poles are selected as standardised components that enable a building height of two metres. This reduces waste. The component station may be different from the assembly side. The assembly-side may be located at the customer and/or buyer of the carton flow bed rack. The component-station may be located at the manufacturer and/or seller of the carton flow bed rack. The specifications may be transmitted to the component-station in a digital form, e.g., as digital data. The digital data may be processed on a computer to select the required standardised components.

In a further development of this embodiment, the method further comprises the steps:
  at the component-station, the selected components are dimensioned according to the transmitted specifications regarding the carton flow bed rack; and
  the selected and dimensioned components are transported to the assembly-side.

Here, the dimensioning occurs at the component-station. This reduces noise, work time, and/or waste at the assembly-side. Thus, the component-station not only enables the selection of the required components, but also comprises the required machines to dimension, e.g. cut, the selected standardised components according to the specifications of the carton flow bed rack.

According to an alternative embodiment, the selected components are transported to the assembly-side (in an undimensioned manner). At the assembly side, the selected components are dimensioned according to said specifications regarding the carton flow bed rack. Here, the standardised components are dimensioned and/or cut at the assembly-side. This embodiment might enable a pre-established packing form of the standardised components. When sending and/or transporting the standardised components in their uncut, namely undimensioned manner, they may be packed more tightly and, thus, be easier to transport.

According to an aspect, a carton flow bed rack comprises:
  a specifiable number of levels, wherein each level of the carton flow bed rack comprises a specifiable load end, and/or a specifiable unload end, and/or a specifiable stop end;
  substantially vertically aligned support poles comprising a scalable height each;
  substantially horizontally aligned side beams connected to the support poles, wherein each side beam comprises a scalable depth; and
  at least one substantially horizontally aligned end beam at each load end, at each unload end, and/or at each stop end, wherein the end beams comprise a scalable depth.

Herein, the support poles, and/or the side beams, and/or the end beams are provided as components dimensioned according to a specified height, a specified width, and/or a specified depth of the carton flow bed rack, e.g. from standardised components.

The carton flow bed rack may be constructed according to the method of the previous aspect. Thus, all remarks regarding the method apply to the carton flow bed rack and vice versa.

The support poles, the side beams, and the end beams are scalable. In the carton flow bed rack, said members are dimensioned according to the specifications, namely its height, its width, or its depth. The standardised components provide modules of the carton flow bed rack from which the dimensioned components of the carton flow bed rack are assembled.

According to an embodiment, the support poles, and/or the side beams, and/or the end beams are provided as at least partially hollow profiles. These hollow profiles increase the stability of the carton flow bed rack at a minimal weight. Furthermore, the support poles, the side beams, and/or the end beams may be provided as metallic components which increase the stability of the carton flow bed rack.

Furthermore, all or most of the other components of the carton flow bed rack may be provided as substantially metallic components. However, end caps and side caps may be provided as plastic components.

An aspect relates to a carton flow bed rack obtained according to the method of the first aspect.

Embodiments of the invention are described with reference to the figures. Features of the embodiments shown in the figures may be combined with each other and/or further embodiments. Identical reference numbers identify identical or similar features of the embodiments.

DETAILED DESCRIPTION

Figure 1:
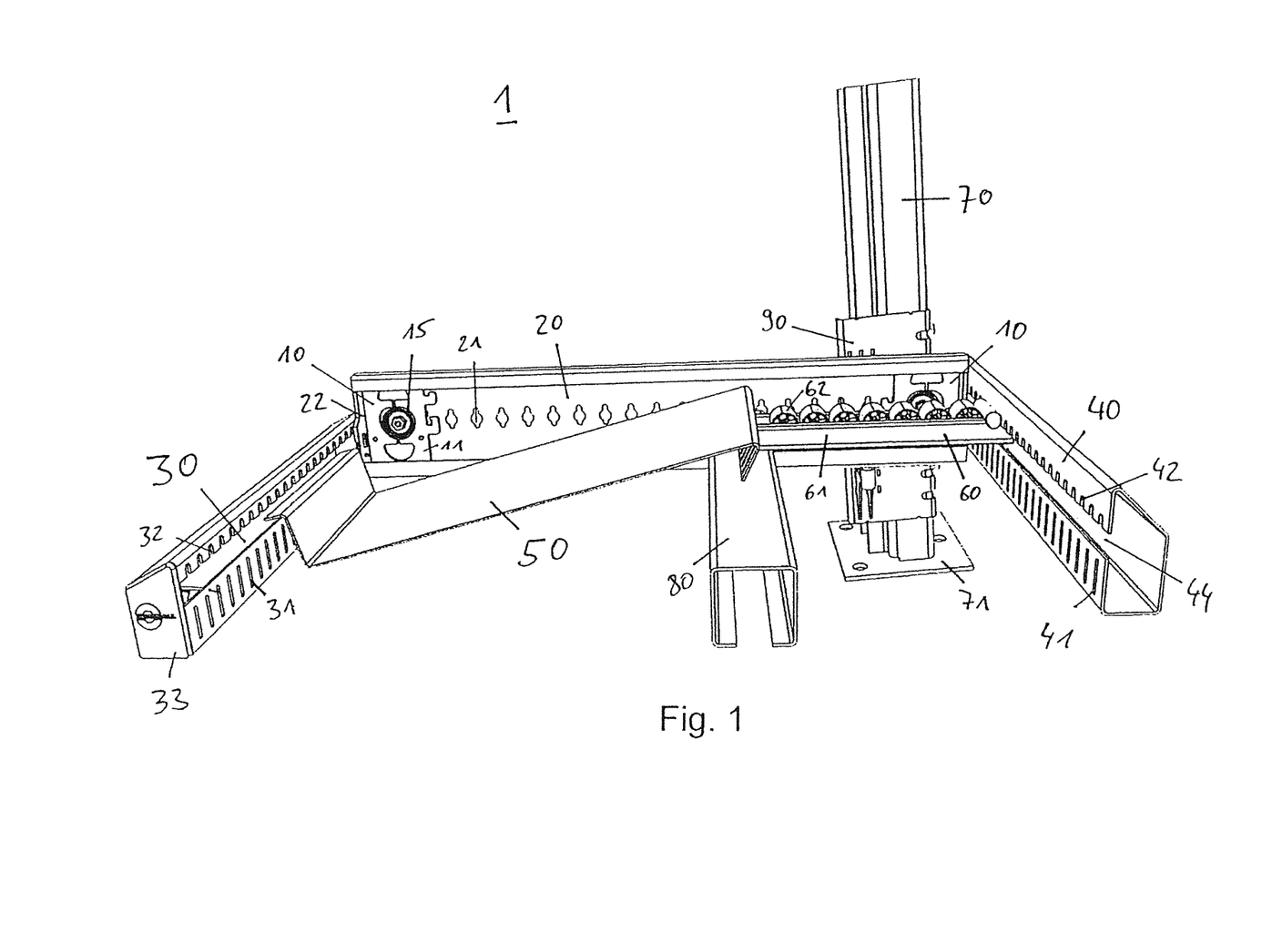
FIG. 1 a perspective view of a carton flow bed rack wherein beams are connected by a mounting device.

FIG. 1 shows a perspective view of a carton flow bed rack 1, in particular a modular carton flow bed rack. Not all but only some elements of the carton flow bed rack 1 are shown to enable a better view of its different components.

The carton flow bed rack 1 is supported by at least one support pole 70 arranged in a substantially vertical direction. A stand 71 of the support pole 70 abuts the floor and supports the weight of the carton flow bed rack 1 at least partially. The carton flow bed rack 1 may comprise multiple support poles 70, in particular at least four support poles 70 arranged at the four corners of the substantially cubic carton flow bed rack 1.

The support pole 70 is connected to at least one side beam 20. The side beam 20 is implemented as a support beam and aligned in a substantially horizontal direction. Herein, the side beam 20 may be arranged at an inclination angle of about 1° to about 10°, e.g. of about 5°, from its upper side at the load end to its lower side at the unload end. The side beam 20 is aligned substantially perpendicular to the support pole 70. FIG. 1 shows only a single side beam 20 at a far side of the carton flow bed rack 1. In the carton flow bed rack 1, a corresponding side beam at the opposite side of the carton flow bed rack 1, namely the side facing the viewer of FIG. 1, is omitted. Furthermore, the carton flow bed rack 1 shown in FIG. 1 comprises only a single level, similar to a rack comprising a single shelf. However, different embodiments of the carton flow bed rack may comprise a plurality of levels arranged substantially above each other in a vertical direction. In these carton flow bed racks, the at least one support pole 70 may support a plurality of side beams 20 arranged above each other. Each level may comprise two side beams 20, arranged at opposite lateral sides of the level.

The carton flow bed rack 1 comprises three different support beams connected by two mounting devices 10. At a first end of the side beam 20, in particular at its unload end, the side beam 20 is connected to an unload beam 30. The unload beam 30 is arranged in a substantially horizontal direction and substantially perpendicular to the side beam 20.

At the opposite end of the side beam 20, in particular at its load end, the side beam 20 is connected to a load beam 40. The load beam 40 is arranged substantially horizontal and substantially perpendicular to the side beam 20.

At each of said two ends of the side beam 20, a mounting device 10 is arranged to enable the connection with the respective end beam, namely the load beam 40 or the unload beam 30. In other words, two mounting devices 10 are arranged at and/or attached to the two ends of the side beam 20.

Between the load beam 40 and the unload beam 30, the carton flow bed rack 1 comprises at least one intermediate beam 80 arranged substantially parallel to both the load beam 40 and the unload beam 30. The side beam 20, the load beam 40, the unload beam 30, and the intermediate beam 80 define and support a single level of the carton flow bed rack 1.

Between the load beam 40 and the intermediate beam 80, the carton flow bed rack 1 comprises at least one wheel track 60. The wheel track 60 comprises a plurality of wheels 62 and/or rolls arranged within a guide rail 61 that support transporting a load, in particular a parcel and/or a carton, loaded onto the wheel track 60 at the load beam 40. The wheel track 60 is shown truncated and may be implemented longer, in particular some meters long. The wheel track 60 may comprise an inclination from the load side towards the intermediate beam 80.

Supported by both the intermediate beam 80 and the unload beam 30, an unload tray 50 is arranged. The unload tray 50 abuts the wheel track 60 at the intermediate beam 80. A load, which is loaded onto the wheel track 60 at the load beam 40, may be transported by gravity on the inclined wheel track 60 to the intermediate beam 80 where it is transferred to the unload tray 50. The unload tray 50 is arranged in a tilted manner comprising an inclination that enables a sliding movement of a load from the higher end of the unload tray 50, arranged at the intermediate beam 80, towards the lower end of the unload tray 50, arranged at the unload beam 30. At said lower end of the unload tray 50, the unload beam 30 may provide a stop that limits further transportation of the load. Thus, the load may rest upon the unload tray 50 until it is unloaded at the unload beam 30.

The load beam 40 and the unload beam 30 are provided as end beams of the carton flow bed rack 1. The side beam 20, the load beam 40 and the unload beam 30 provide support beams of the carton flow bed rack 1.

Different carton flow bed racks may comprise a plurality of wheel tracks 60 arranged substantially parallel to each other and/or a plurality of unload trays 50 in the same level. In these carton flow bed racks, a plurality of loads, in particular parcels and/or cartons, may be loaded at the load side in parallel, namely the side which ends at the load beam 40. The shown carton flow bed rack 1 supports loading cartons from one side (the load side) and unloading them from the opposite side (the unload side) of the carton flow bed rack 1. This build of the carton flow bed rack is referred to as FIFO—'first in first out'.

In different embodiments, carton flow bed racks may support loading and unloading at the same side. These builds of the carton flow bed rack are referred to as LIFO—'last in first out'. The invention may be implemented as a LIFO and/or as a FIFO carton flow bed rack. A LIFO carton flow bed rack may be implemented without any unload tray 50, because each level of the carton flow bed rack will be loaded and unloaded at the same end beam. Therefore, in a LIFO carton flow bed rack, the loads may only be supported by wheel tracks 60 arranged between both opposite end beams. In another embodiment of a FIFO carton flow bed rack without unload tray, the loads may also be only supported by wheel tracks 60 between the load beam(s) and the respective unload beam(s).

At the ends of the side beam 20, the mounting devices 10 are arranged to enable the connections to the end beams 30, 40. Here, the mounting devices 10 may be identical. The mounting device 10 comprises an attachment plate 11 that is arranged with a first flat side facing the side beam 20. The mounting device 10 further comprises an eccentric stud 15 inserted into a through-hole of the attachment plate 11 and into an opening 21 of the side beam 20. The side beam 20 comprises a plurality of such openings 21 arranged substantially equidistantly from each other in a substantially horizontal direction along its substantially vertically aligned flat surface.

As shown in FIG. 1, the load beam 40 is arranged at the load end of the side beam 20 at a different height than the unload beam 30 at the unload end of the side beam 20. In the shown embodiment of the carton flow bed rack 1, the unload beam 30 is arranged lower than the load beam 40. However, both different height positions and/or installation heights of the respective end beams 30, 40 are supported and enabled by identical mounting devices 10.

At the support pole 70, a support device 90 is arranged. The support device 90 is fixed to the support pole 70 at a specified height and supports the side beam 20. The carton flow bed rack 1 may comprise a plurality of support poles 70, in particular at least two support poles 70 supporting each side beam 20. Usually, no support poles 70 are arranged at the load end and at the unload end to enable free access to these ends. However, in different embodiments, support poles 70 may be arranged to also support at least one of the end beams, namely the unload beam 30 and the load beam 40. In particular in LIFO-racks, support poles may be arranged at the stop beam where no access to the loads is required.

Figure 2:
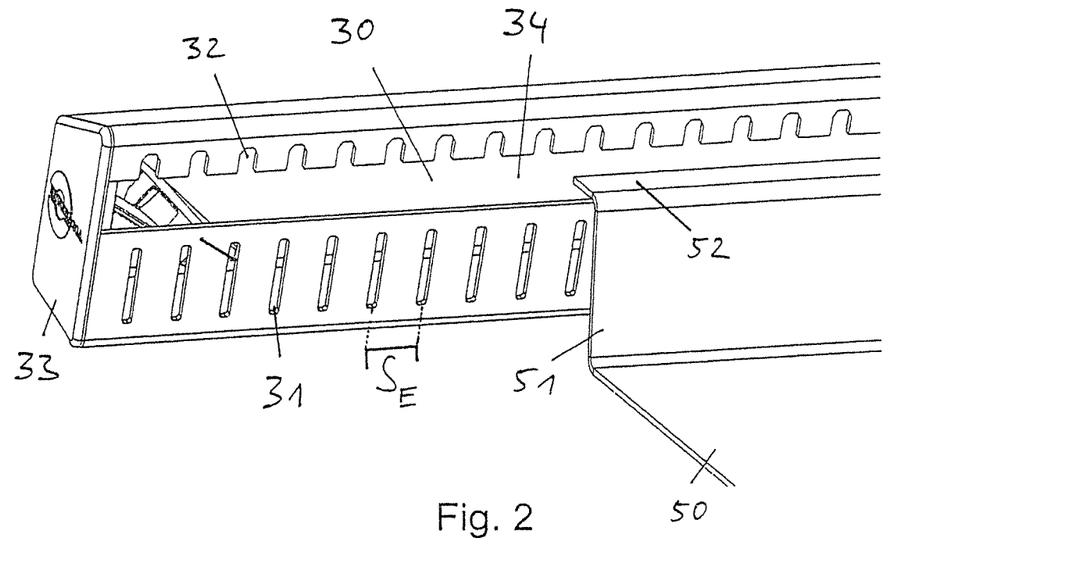
FIG. 2 an enlarged detail view of the carton flow bed rack of FIG. 1, an unload beam supporting an unload tray.

FIG. 2 shows an enlarged detail view of the carton flow bed rack 1 of FIG. 1, namely an end of the unload beam 30 supporting the unload tray 50. The unload beam 30 is provided as an at least partially hollow profile, wherein the cross section of the unload beam 30 is mostly hollow and at least partially surrounded by the, e.g., metallic structure forming the unload beam 30. The implementation of the beam as at least partially hollow profile increases the stability of the respective beam.

The unload beam 30 comprises a notch 34 at its inner side, namely its side facing towards the center of the respective level of the carton flow bed rack 1. At its upper, lower, and outer surface, the unload beam 30 is substantially closed. The notch 34 extends along the whole inner side of the unload beam. In other words, the notch 34 is as long as the carton flow bed rack 1 is wide.

The notch 34 provides a rest for a protrusion shield 52 of the unload tray 50. The protrusion shield 52 is arranged at an end of the unload try 50 facing the unload side of the carton flow bed rack 1 and protrudes into the notch 34. The protrusion shield 52 of the unload tray 50 rests on a lower rim of the side beam 30 adjoining the notch 34.

At its inner side, the unload beam 30 further comprises a plurality of lower recesses 31 and a plurality of upper recesses 32. The lower recesses 31 are arranged as slots within the lower rim of the unload beam 30. The upper recesses 32 are arranged as slots within an upper rim adjoining the notch 34. The recesses 31, 32 are used to connect the unload beam 30 to the side beam 20 via the mounting device 10.

Both the upper recesses 32 and the lower recesses 31 are equidistantly spaced apart from each other along the width of the carton flow bed rack 1, namely along the whole inner side of the unload beam 30. The recesses 31, 32 are spaced apart by an end beam scaling $S_E$. Said end beam scaling $S_E$ corresponds to a substantially horizontal length measured from a center of one recess 31, 32 to a center of each adjoining recess 31, 32. The end beam scaling $S_E$ may be less than 5 cm, preferably less than 2 cm, in particular from about 1 cm to about 1.5 cm.

The unload beam 30 is provided from a standardized component, namely from a standardized end beam comprising a small beam-height. Said standardized end beam is dimensioned according to a specified width of the carton flow bed rack 1. The width of the carton flow bed rack 1 may be specified within a predetermined width scaling, corresponding to the end beam scaling $S_E$. After the desired width of the carton flow bed rack 1 is specified, one of the standardized end beams may be cut, truncated, and/or dimensioned to suffice said specified width. Thus, the unload beam 30 is provided.

To enable safe assembly of the carton flow bed rack 1, the width may only be specified within said predetermined width scaling of the carton flow bed rack 1, which depends on the end beam scaling $S_E$. Thus, in the assembled carton flow bed rack 1, the recesses 31, 32 of all unload beams 30 (corresponding to dimensioned standardized end beams) comprise predetermined distances to the ends of the unload beam 30 and may, thus, be safely connected via the mounting devices 10 to their respective side beams 20.

The unload tray 50 is provided as a substantially flat sheet comprising an inclination from an upper tray end arranged at the intermediate beam 80 towards a lower tray end arranged at the unload beam 30. At the lower tray end, a step is provided within the unload tray 50 forming a stop shield 51. The stop shield 51 serves as a stop for any load arranged on top of the unload tray 50. The stop shield 51 is aligned within a plane that is substantially perpendicular to the main surface of the unload tray arranged at the inclination. The inclination of the unload tray 50 may be specified when planning the carton flow bed rack 1.

The unload tray 50 is provided from a standardized component, namely from a standardized unload tray. Said standardized unload tray is dimensioned according to a specified width of the carton flow bed rack 1. The width of the carton flow bed rack 1 may be specified within a predetermined width scaling, corresponding to the end beam scaling $S_E$. After the desired width of the carton flow bed rack 1 is specified, one of the standardized unload trays may be cut, truncated, and/or dimensioned to suffice said specified width. Thus, the unload tray 50 is provided.

At a lateral end of the unload beam 30, an end cap 33 is provided closing the hollow profile of the unload beam 30. Without the end cap 33, the lateral side would be open, similar to the lateral end of the load beam 40 facing the viewer in FIG. 1. The end cap 33 closes the lateral end of the side beam 30 and may be implemented as plastic component.

Figure 3:
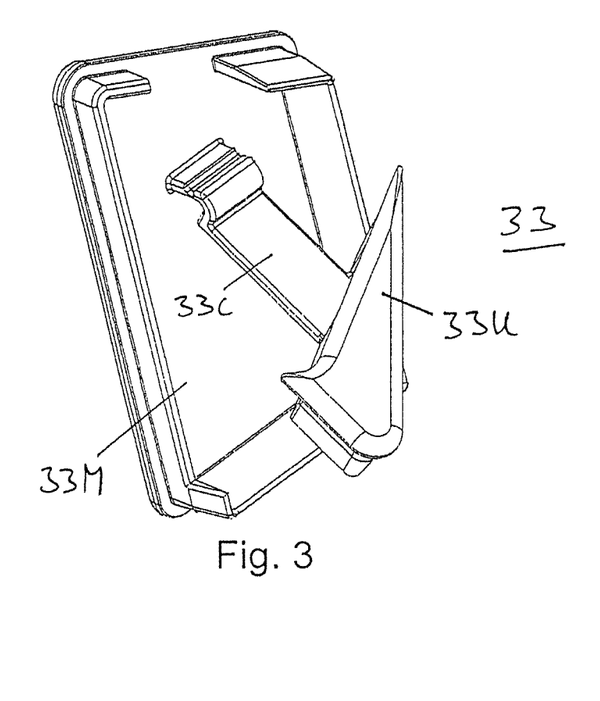
FIG. 3 a perspective view of an end cap of the end beam.

FIG. 3 shows a perspective view of the end cap 33 of the end beam 30. The end cap 33 comprises a main body 33M and an upper body 33U which is connected to the main body 33M via a connection 33C. The end cap 33 may be provided as a standardised component for closing the lateral ends of the end beams which may comprise two different beam-heights.

For an end beam comprising a first, e.g. small, beam-height (as the unload beam 30), the main body 33M is sufficient to close its lateral end. Therefore, the upper end 33U is not required and may be folded back as shown in FIG. 3.

For an end beam comprising a second, e.g. large, beam height (as the load beam 40 shown in FIG. 1), the main body 33M is insufficient to close its lateral end. For closing the load beam 40, the upper end 33U is not folded back but arranged as an extension of the main body 33M to enlarge the area that the end cap 33 may close.

Even though not shown in a separate figure besides FIG. 1, the load beam 40 is also provided from a standardized component, namely from a standardized end beam comprising the large beam-height. The standardized end beam comprising the large beam-height is formed similar to the standardized end beam comprising the small beam-height from which the unload beam 30 is provided.

Thus, similar to the unload beam 30, at its inner side, the load beam 40 comprises a plurality of lower recesses 41 and a plurality of upper recesses 42. The lower recesses 41 are arranged as slots within a lower rim of the load beam 40. The upper recesses 42 are arranged as slots within an upper rim adjoining a notch 44. The recesses 41, 42 are used to connect the load beam 40 to the side beam 20 via the mounting device 10.

Both the upper recesses 42 and the lower recesses 41 are equidistantly spaced apart from each other along the width of the carton flow bed rack 1, namely along the inner side of the load beam 40. The recesses 41, 42 are spaced apart by the end beam scaling $S_E$ which may be the same as the end beam scaling $S_E$ of the unload beam 30.

The standardized end beam from which the load beam 40 is provided, is dimensioned according to a specified width of the carton flow bed rack 1. After the desired width of the carton flow bed rack 1 is specified, one of the standardized end beams with the large beam-height may be cut, truncated, and/or dimensioned to suffice said specified width. Thus, the load beam 40 is provided. To enable safe assembly of the carton flow bed rack 1, the width may only be specified within said predetermined width scaling of the carton flow bed rack 1, which depends on the end beam scaling $S_E$. Thus, the recesses 41, 42 of all load beams 40 corresponding to dimensioned standardized end beams comprise predetermined distances to the ends of the load beam 40 and may, thus, be safely connected via the mounting devices 10 to their respective sides beams 20.

Similar to the load beam 40 and the unload beam 30, also stop beams and load/unload beams in FIFO-racks may be provided from these two standardised end beams with the, e.g., two different beam-heights. The standardized end beams with the larger beam-height may—besides the already mentioned beam-height—be substantially identical to the standardized end beams with the small beam-height. However, the standardized end beam with the larger beam-height may comprise a slightly larger upper rim and, thus, a slightly larger inner side facing the center of the respective level.

Figure 4:
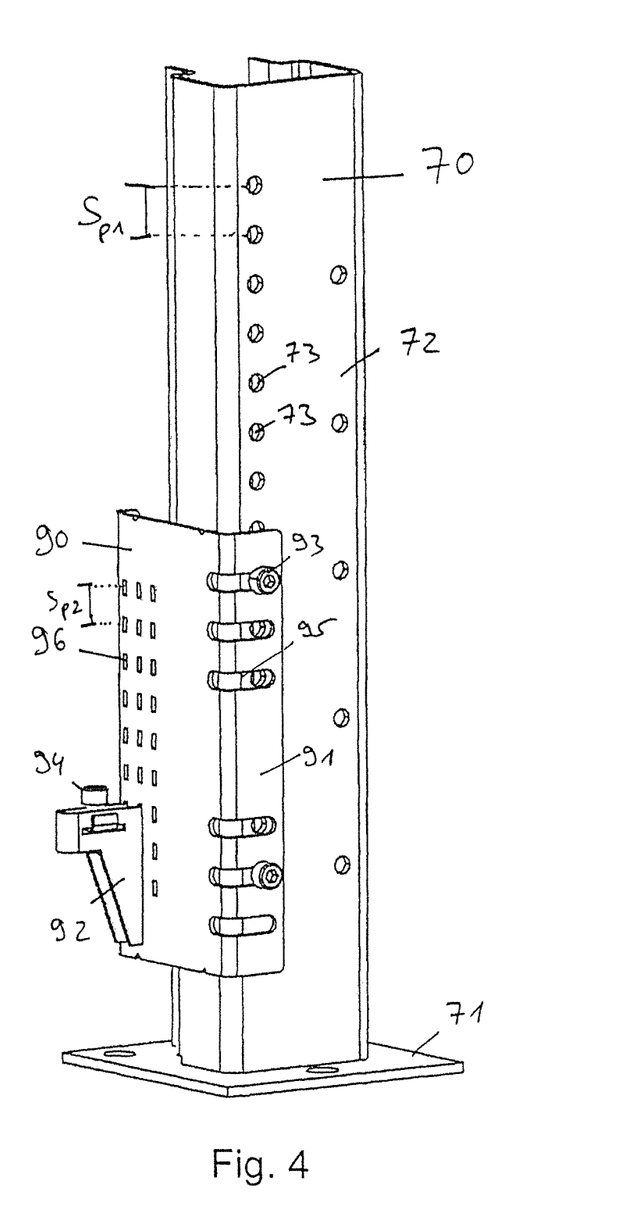
FIG. 4 a perspective view of a support pole with a support device of the carton flow bed rack of FIG. 1.

FIG. 4 shows a perspective view of the support pole 70 with the support device 90 of the carton flow bed rack 1. The support pole 70 is supported at its lower base by the stand 71 which may be implemented as a flat metallic plate. The stand 71 supports a substantially vertically arranged profiled rail 72 which may be implemented as at least partially hollow profile.

Along its (substantially vertical) length, the profiled rail 72 comprises a plurality of support openings 73. These support openings 73 are equidistantly spaced apart from each other by a first pole scaling $S_{P1}$ along the height of the carton flow bed rack 1. Said first pole scaling $S_{P1}$ corresponds to a substantially vertical length measured from a center of one of the support openings 73 to a center of an adjoining support opening 73. The first pole scaling $S_{P1}$ may be less than 5 cm, preferably less than 3 cm, in particular from about 1.5 cm to about 2.5 cm.

The support pole 70 is provided from a standardized component, namely from a standardized support pole. Said standardized support pole is dimensioned according to a specified height of the carton flow bed rack 1. The height of the carton flow bed rack 1 may be specified within a predetermined height scaling, corresponding to the first pole scaling $S_{P1}$. After the desired height of the carton flow bed rack 1 is specified, one of the standardized support poles may be cut, truncated, and/or dimensioned to suffice said specified height. Thus, the support pole 70 is provided. To enable safe assembly of the carton flow bed rack 1, the height may only be specified within said predetermined width scaling of the carton flow bed rack 1, which depends on the first pole scaling $S_{P1}$.

In some embodiments, the height of the carton flow bed rack may not be specified but is predetermined, e.g. according to standard working heights.

At the support openings 73, the support device 90 is fixed to the support pole 70 by fixtures 93. The fixtures 93 may be implemented as screws and may be inserted into side slits 95 of a support plate 91 of the support device 90. The support plate 91 may be bent to cling to the outer surface of the profiled rail 72. At least some of the side slits 95 may be spaced apart from each other at the first support scaling $S_{P1}$ to enable easy assembling with the fixtures 93.

A main part of the support plate 91 may be arranged at an inner side of the profiled rail 72 facing the center of the carton flow bed rack 1. The side slits 95 and the fixtures 93 may be arranged at a side of the profiled rail 72 not facing the center of the carton flow bed rack 1. Thus, space for the loads on the different levels of the carton flow bed rack 1 is freed.

The support plate 91 may comprise a plurality of front slits 96 in the side facing the center of the carton flow bed rack 1. These front slits 96 are equidistantly spaced apart from each other by a second pole scaling $S_{P2}$ along the height of the carton flow bed rack 1. Said second pole scaling $S_{P2}$ corresponds to a substantially vertical length measured from a center of one of the front slits 96 to a center of an adjoining front slit 96. The second pole scaling $S_{P1}$ may be less than 5 cm, preferably less than 3 cm, in particular from about 1.5 cm to about 2.5 cm.

The predetermined height scaling of the carton flow bed rack 1 may depend either on the first pole scaling $S_{P1}$, the second pole scaling $S_{P2}$, or both.

The front slits 96 provide grip for a bracket 92 of the support device 90. The bracket 92 protrudes from the support plate 91 inwards towards the center of the carton flow bed rack 1. An upper part of the bracket 92 forms an upper surface and, thus, a support for the side beam 20. The side beam 20 may be fixed to the bracket 92 by a fixture 94, e.g. a screw.

The carton flow bed rack 1 may comprise one support device 90 for each of its levels at each support pole 70. In other embodiments, the support plate 91 extends substantially along the whole height of the profiled rail 72. Here, a single support device 90 at each support pole 70 suffices comprising a bracket 92 for each level. In some embodiments, the front slits 96 are provided at the inner side of the profiled rail 72, thus providing direct access for the brackets 92 without support plate 91.

The vertical distance between the levels of the carton flow bed rack 1, the number of levels, and/or the height of the carton flow bed rack 1 may be specified with respect to the first and second pole scaling $S_{P1}$ and $S_{P2}$.

Figure 5:
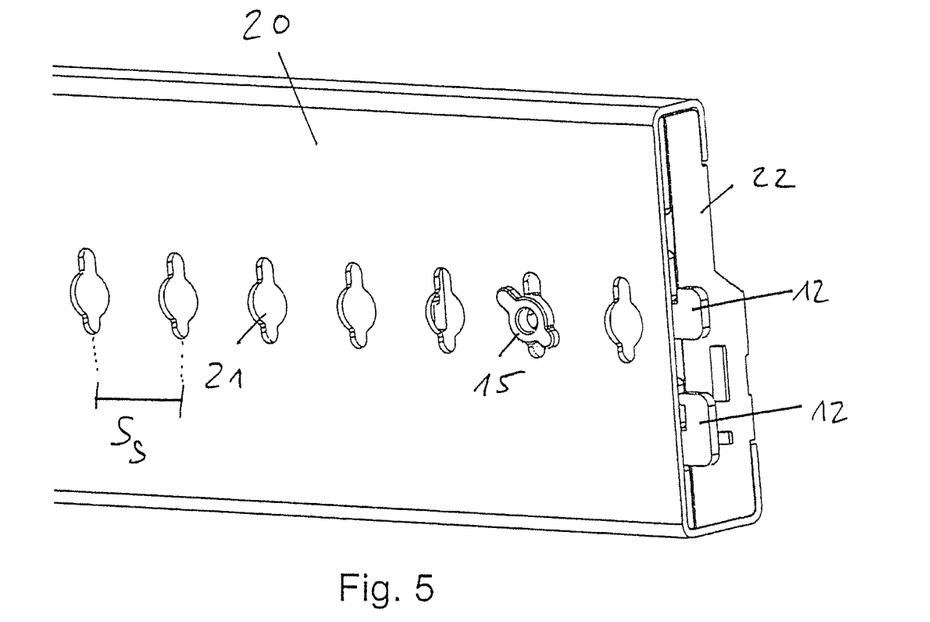
FIG. 5 a perspective rear view of a side beam with parts of a mounting device connecting the side beam to an end beam.

FIG. 5 shows a perspective view of an outer side of the side beam 20 with a parts of the mounting device 10 connecting the side beam 20 to the unload beam 30 (which is omitted in FIG. 5).

As shown in FIG. 1, the mounting device 10 comprises an attachment plate 11 that is arranged with a first flat side facing the side beam 20. The mounting device 10 further comprises an eccentric stud 15 inserted into a through-hole of the attachment plate 11 and into an opening 21 of the side beam 20. The side beam 20 comprises a plurality of such openings 21 arranged substantially equidistantly from each other in a substantially horizontal direction along its substantially vertically aligned flat surface. The openings 21 are spaced apart by a side beam scaling $S_S$. Said side beam scaling $S_S$ corresponds to a substantially horizontal length measured from a center of one of the openings 21 to a center of an adjoining opening 21. The side beam scaling $S_S$ may be less than 5 cm, preferably less than 3 cm, in particular from about 2 cm to about 3 cm.

At the unload end of the side beam 20 facing the unload beam 30, a side cap 22 is arranged. The side beam 20 is provided as an at least partially hollow profile, wherein the cross section of the side beam 20 is mostly hollow and at least partially surrounded by the e.g. metallic structure forming the side beam 20. The implementation of the profile as at least partially hollow increases the stability of the respective beam. The mounting device 10 is arranged within the hollow profile of the side beam 20.

In FIG. 5, only the tip at an insertion end of the eccentric stud 15 is shown protruding from the back side of the side beam 20. The eccentric stud 15 is turned into a position wherein pins at its tip prevent the eccentric stud 15 from moving out of the opening 21 against an insertion direction. To enable an easy insertion of the insertion end of the eccentric stud 15, the openings 21 are substantially circular shaped comprising wing-like extensions that enable access for the pins of the eccentric stud 15.

FIG. 5 further shows engaging elements 12 of the attachment plate 11 protruding past the side cap 22 of the side beam 20 into the hollow profile of the unload beam 30 where they support the weight of the unload beam 30. In the assembled state, the engaging elements 12 engage into the recesses 31, 32 of the unload beam 30 or the recesses 41, 42 of the load beam 40.

The side beam 20 is provided from a standardized component, namely from a standardized side beam. Said standardized side beam is dimensioned according to a specified depth of the carton flow bed rack 1. The depth of the carton flow bed rack 1 may be specified within a predetermined width scaling, corresponding to the side beam scaling $S_S$. After the desired depth of the carton flow bed rack 1 is specified, one of the standardized side beams may be cut, truncated, and/or dimensioned to suffice said specified depth. Thus, the side beam 20 is provided. To enable safe assembly of the carton flow bed rack 1, the depth may only be specified within said predetermined depth scaling of the carton flow bed rack 1, which depends on the side beam scaling $S_S$. Thus, in the assembled carton flow bed rack 1, the openings 21 of all side beams 20 (corresponding to dimensioned standardized side beams) comprise predetermined distances to the ends of the side beam 20 and may, thus, be safely connected via the mounting devices 10 to the end beams 30 and 40.

Figure 6:
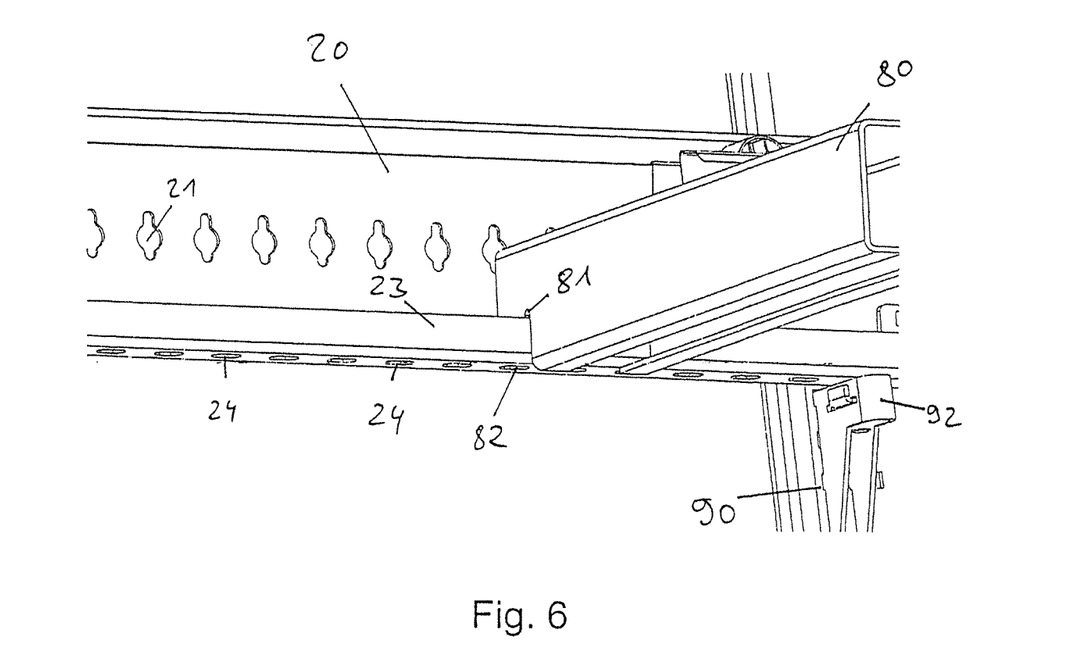
FIG. 6 a perspective view of an intermediate beam connected to a side beam.

FIG. 6 shows a perspective view of the intermediate beam 80 connected to the side beam 20. The intermediate beam 80 is provided as at least partially hollow profile from a standardized component, namely from a standardized intermediate beam. Said standardized intermediate beam is dimensioned according to a specified width of the carton flow bed rack 1. As already mentioned, the width of the carton flow bed rack 1 may be specified within a predetermined width scaling, corresponding to the end beam scaling $S_E$. After the desired width of the carton flow bed rack 1 is specified, one of the standardized intermediate beams may be cut, truncated, and/or dimensioned to suffice said specified width. Thus, the intermediate beam 80 is provided.

At a predetermined distance from at least one of its ends, at least one a bottom slit 81 is cut into the dimensioned intermediate beam, so that the dimensioned intermediate beam 80 may be set on a lower rim of the side beam 20 as shown in FIG. 6. Here, the intermediate beam 80 provides support for both the wheel tracks 60 and the unload tray 50. The intermediate beam 80 may comprise at least one protrusion 82 at its end facing the side beam 20, e.g. arranged between the bottom slit 81 and its lateral end. The protrusion 82 extends substantially downwards and is arranged within one of a plurality of holes 24 provided at a lower side of the side beam 20. Thus, a lateral sliding movement of the intermediate beam 80 on the lower rim of the side beam 20 is prevented.

To construct the carton flow bed rack 1, some specification are made, e.g. a width, a depth, a height, an inclination for the unload trays 50, and/or a number of level is specified. Afterwards, said specifications are transmitted to a component-station comprising the standardised components. The required standardised components are selected at the component-station and transported to an assembly-side. The standardised components are dimensioned according to the specifications, either at the component-station or at the assembly-side. At the assembly side, the dimensioned components are assembled to construct the carton flow bed rack 1.

In an alternative embodiment, the individual components are produced at their specified dimension, e.g. length. Here, no standardised components are required. Thus, the components may be provided with less, e.g. only the required, attachment means arranged at predetermined, e.g. constant, distances to the respective end of the components. In particular, the side beam 20 may comprise less (e.g. only the required) openings 21 at its ends. The unload beam 30 may comprise less (e.g. only the required) recesses 31, 32 at its ends. The load beam 40 may comprise less (e.g. only the required) recesses 41, 42 at its ends. Also, the support pole 70 and/or the support plate 91 may comprise less (e.g. only the required) support openings 73, side slits 95, and/or front slits 96. The predetermined distances of the attachment means 21, 31, 32, 41, 42, 73, 82, 95, and/or 96 at the respective components may be part of predetermined rack-settings that may be considered when specifying the carton flow bed rack.

However, this rack may be provided with identical components, some of which may be standardised, e.g. the same mounting devices 10, side caps 22, end caps 33, etc. Furthermore, also some of the parts of the other components may be identical and, e.g., standardised, e.g. the wheels 62 of the wheel tracks 60, the brackets 92 of the support devices 90, etc.

LIST OF REFERENCE NUMERALS

1 carton flow bed rack
10 mounting device
11 attachment plate
12 engaging element
15 eccentric stud
20 side beam
21 opening
22 side cap
23 lower rim
24 hole
30 unload beam
31 lower recess
32 upper recess
33 end cap
33C connection
33M main body
33U upper body
34 notch
40 load beam
41 lower recess
42 upper recess
50 unload tray
51 stop shield
52 protrusion shield
60 wheel track
61 guide rail
62 wheel
70 support pole
71 stand
72 profiled rail
73 support openings
80 intermediate beam
81 bottom slit
82 protrusion
90 support device
91 support plate
92 bracket
93 fixture
94 fixture
95 side slit
96 front slit
$S_E$ end beam scaling
$S_{P1}$ first pole scaling
$S_{P2}$ second pole scaling
$S_S$ side beam scaling

The invention claimed is:

1. A method for constructing a carton flow bed rack (1), comprising the steps of:
    specifying a number of levels of the carton flow bed rack (1);
    specifying whether and where each of the levels comprises a load end, and/or an unload end, and/or a stop end;

specifying at least one of a height, a width, and a depth of the carton flow bed rack (1);

transmitting said specifications regarding the carton flow bed rack (1) to a component-station;

at the component-station, selecting the required components from standardized components the components required to assemble the carton flow bed rack (1);

dimensioning the selected components according to said specifications; and at an assembly-side, assembling the carton flow bed rack (1) from the selected and dimensioned components.

2. The method of claim 1, wherein the height, the width, and/or the depth of the carton flow bed rack (1) are specified within a continuously variable scaling, and wherein the dimensioned components are produced at the component-station.

3. The method of claim 1, wherein:

at least one of the height, the width, and the depth of the carton flow bed rack (1) is specified within a predetermined scaling for each of the three dimensions; and the components for assembling the carton flow bed rack (1) are provided and dimensioned according to said specifications from the standardized components.

4. The method of claim 3, wherein the height, the depth, and/or the width of the carton flow bed rack (1) is specified within the predetermined scaling of at most 5 cm.

5. The method of claim 1, wherein the components are produced at a component-station in a roll form process.

6. The method of claim 1, wherein:

selecting, dimensioning and assembling at least one support pole (70) according to the specified height; and/or selecting, dimensioning and assembling at least one side beam (20) according to the specified depth for each of the levels of the carton flow bed rack (1); and/or selecting, dimensioning and assembling at least one end beam (30; 40) for each of the specified load ends, for each of the specified unload ends, and/or for each of the specified stop ends according to the specified width.

7. The method of claim 6, wherein:

selecting at least one unload tray (50) and assembling the selected at least one unload tray (50) at a specifiable inclination angle at each of the specified unload ends of the carton flow bed rack (1); and/or selecting at least one wheel track (60) for transporting loads within one of the levels of the carton flow bed rack (1) and assembling the selected at least one wheel track (60) at each of the load ends of the carton flow bed rack (1); and/or selecting, dimensioning and assembling at least one intermediate beam (80) for supporting a wheel track (60) and/or an unload tray (50) according to the specified width; and/or selecting and assembling at least one mounting device (10) for connecting each of the end beams (30; 40) to at least one of the side beams (20); and/or selecting and assembling at least one support device (90) for connecting each of the side beams (20) to at least one of the support poles (70); and/or selecting and assembling at least one side cap (22) at each end of the side beams (20); and/or selecting and assembling at least one end cap (33) at each end of the end beams (30; 40).

8. The method of claim 1, further comprising the step of specifying an inclination angle of at least one unload tray (50) at each of the unload beams (30) of the carton flow bed rack (1) from at least two different inclination angles.

9. The method of claim 1, further comprising the steps:

specifying a number of wheel tracks (60) at each of the load beams (40) of the carton flow bed rack (1); and/or specifying a number of intermediate beams (80) for each of the levels of the carton flow bed rack (1).

10. The method of claim 1, further comprising the step of specifying the beam-height of each of the end beams (30; 40) of the carton flow bed rack (1);

and/or further comprising the step of specifying a vertical distance between two adjacent levels of the levels of the carton flow bed rack (1) within a predetermined scaling of at most 5 cm.

11. The method of claim 1, further comprising:

dimensioning the selected components at the component-station according to the transmitted specifications regarding the carton flow bed rack (1); and transporting the selected and dimensioned components to the assembly-side.

12. The method of claim 1, further comprising:

transporting the selected components to the assembly-side; and dimensioning the selected components at the assembly-side according to said specifications regarding the carton flow bed rack (1).

\* \* \* \* \*